May 8, 1956 W. M. BASS 2,744,350
ROLLER FISH NET
Filed June 22, 1954 2 Sheets-Sheet 1

Wilfred M. Bass
INVENTOR.

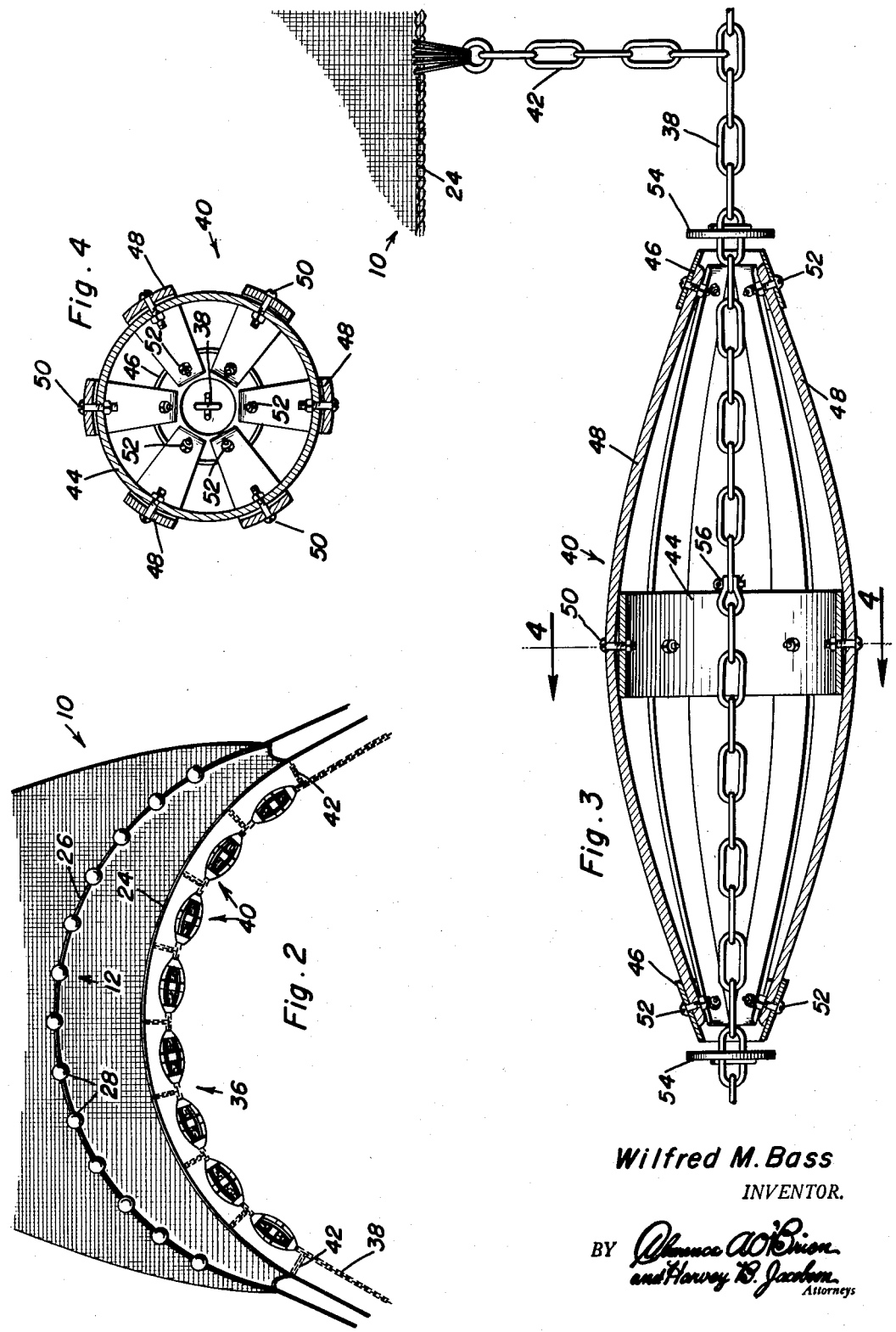

United States Patent Office 2,744,350
Patented May 8, 1956

2,744,350

ROLLER FISH NET

Wilfred M. Bass, Fort Myers, Fla.

Application June 22, 1954, Serial No. 438,544

3 Claims. (Cl. 43—9)

This invention relates in general to improvements in trawler type fish nets, and more specifically to a roller fish net.

In the use of a trawl net for either a shrimping operation or for trawl fishing, the trawl net is pulled closely adjacent the bottom and oftentimes the lead line thereof causes the lower portion of the mouth of the net to drag along the bottom. Inasmuch as quite often the bottom is rocky or in the form of coral growths, the trawl net is cut up by the bottom and must be repaired quite often.

It is therefore the primary object of this invention to provide a roller attachment for a trawl net, the roller attachment being intended to be mounted in front of the lead line of the trawl net and be attached thereto for pulling on the lead line so as to insure the movement of the lower portion of the mouth of the trawl net over coral or other obstacles whereby snagging of the net is substantially prevented.

Another object of this invention is to provide an improved roller assembly for trawl nets, the roller assembly including a flexible axle in the form of a generally semi-circular arranged chain, the axle having mounted thereon rollers which are freely rotatable to properly support the lower portion of the mouth of an associated trawl net.

Still another object of this invention is to provide a trawl net which includes a roller assembly at the forward portion thereof, the roller assembly causing vibrations as it rolls over the floor of the ocean whereby fish and shrimp will have to come up off the bottom so that the net can catch them while they are up in the water.

A further object of this invention is to provide a wear strip for the lower portion of the cod end of a trawl net whereby when the "cod" end becomes loaded with the catch and has a tendency to scrape upon the ocean bottom the wear strip will engage the ocean bottom so as to prevent wearing of the trawl net.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a fragmentary top plan view of the mouth of the trawl net and shows the arrangement of the variout lines attached thereto;

Figure 1:
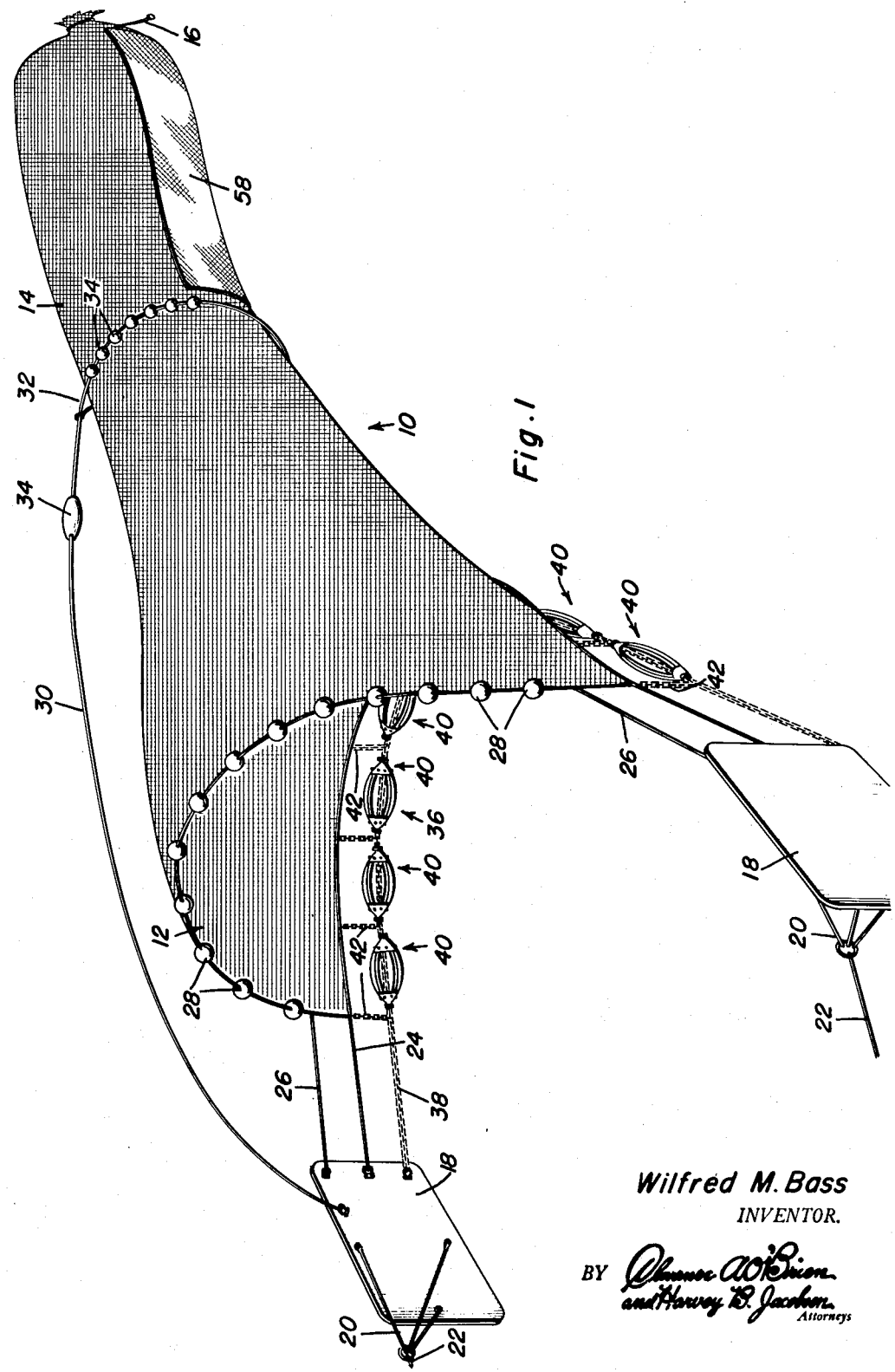
Figure 1 is a perspective view of the trawl net which is the subject of this invention and shows the same as it would appear in operation.

Figure 3 is an enlarged fragmentary plan view of an intermediate portion of the trawl net along the lower part of the mouth thereof and shows the general details of a roller with respect to its axle, the roller being shown in section in order to clearly illustrate the details thereof; and Figure 4 is an enlarged transverse vertical sectional view taken substantially upon the plane indicated by the section line 4—4 of Figure 3 and further shows the details of the construction of a roller.

Referring now to the drawings in detail, it will be seen that there is best illustrated in Figure 1, the trawl net construction which is the subject of this invention. The trawl net construction includes a trawl net which is referred to in general by the reference numeral 10. The trawl net 10 includes an enlarged open mouth which is referred to in general by the reference numeral 12 and a "cod" end 14 for receiving the catch of the trawl net 10. The rear of the "cod" end 14 is retained in a closed state by a tie rope 16.

In order to facilitate the towing of the trawl net 10 there is provided a pair of spaced paravanes 18. The paravanes 18 have connected to the forward portions thereof bridle assemblies 20. Connected to the bridle assemblies 20 are tow lines 22 which will be attached to the boat towing the trawl net.

In order that the mouth 12 may be retained in open state, there is secured to the lower part thereof a lead line 24. The lead line 24 is connected to the rear portions of the paravanes 18 intermediate the heights thereof. Also connected to the paravanes 18 and extending rearwardly therefrom is a float line 26. The float line 26 is provided at spaced intervals with cork floats 28 and extend about the upper boundary of the mouth 12. The float line 26 is longer than the lead line 24 so that the mouth of the trawl net 10 is disposed above and rearwardly of the lower portion thereof which is defined by the lead line 24, as is best illustrated in Figure 2.

In order to facilitate the closing of the "cod" end 14 after a catch has been disposed therein there is provided a "hummer" line 30. The "hummer" line 30 includes a noose portion 32 which encircles the "cod" end 14. Both the noose portion 32 and the main portion of the "hummer" line 30 are provided with suitable floats 34. The floats 34 retain the "hummer" line in a floated state at all times and it never comes into contact with the bottom of the ocean. The forward end of the "hummer" line 30 is suitably connected to one of the paravanes 18.

Also extending rearwardly from the paravanes 18 is a roller assembly which is referred to in general by the reference numeral 36, the roller assembly forming a major part of the present invention. The roller assembly 36 includes a generally semi-circularly arranged drag axle 38 which is flexible. The axle 38 is preferably formed of a flexible member such as a chain. Carried by the axle 38 at spaced intervals are open framework rollers which are referred to in general by the reference numeral 40. The axle 38 is shorter than the lead line 24 and is disposed immediately forwardly thereof. Connecting intermediate portions of the axle 38 to intermediate parts of the lead line 24 adjacent the ends of each of the rollers 40 are a plurality of flexible connecting elements in the form of connecting chains 42.

Referring now to Figure 3 in particular, it will be seen that each of the rollers 40 is of a greater diameter at its center and tapers towards its opposite ends. Each roller 40 is formed by a relatively wide, large center ring 44 and a pair of relatively small diameter end rings 46. It is preferred that the rings 44 and 46 be formed of metal so as to give the rollers 40 proper strength. Extending between the rings 46 and overlying the other portion of the ring 44 are elongated slats 48. The slats 48 are circumferentially spaced and are secured to the ring 44 by suitable fasteners 50. The ends of the slats 48 are disposed within the rings 46 and secured thereto by suitable fasteners 52.

It is to be noted that the axle 38 extends through each roller 40 and that the individual rollers 40 are freely rotatable thereon. The individual rollers 40 are prevented from shifting along the length of the axle 38 by collars 54 disposed at opposite ends thereof. If desired, the axle 38 need not be formed of a single length of chain, but may be formed of a plurality of lengths of chains connected together by suitable connectors 56.

By forming certain parts of each roller 40 of metal and certain parts thereof of wood, it will be seen that the floatable part of each roller 40 will have a tendency to counterbalance the weight of the metal part thereof so that each roller 40 will have little effective weight when under the water. In this manner the rollers will not drag down the lower portion of the mouth of the trawl net 10.

In the operation of the trawl net assembly, the trawl net 10 will be towed in a normal manner. When being towed along the bottom of the ocean, the individual rollers 40 of the roller assembly 36 will roll along the bottom in advance of the mouth 12 of the trawl net 10. Inasmuch as the roller axle carries the entire strain of the roller assembly 36, the rollers are free of all thrust force. As the rollers roll along the bottom of the ocean they will follow the general contour of the bottom irrespective of the nature of the bottom and retain the lower portion of the mouth 12 a slight distance above the bottom. As the rollers roll along the floor of the ocean, they cause vibrations to which fish and shrimp are sensitive and result in the fishing coming up off the bottom and being caught in the trawl net 10. At the same time, the roller prevents the trawl net from picking up such trash as sponge, shells, rock and grass, and other similar materials, and therefore the trawl net 10 is not overloaded with useless objects and permits a maximum catch.

As the "cod" end 14 of the trawl net 10 becomes loaded, it has a tendency to sag toward the floor of the ocean. In order to prevent the snagging and wearing of the bottom part of the snag portion 14, there is secured thereto a large wear strip 58. The wear strip 58 is in the form of rubber belting or the like and will greatly increase the life of the trawl net 10.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. For use in combination with a trawler net adapted to operate near the bed of a body of water including a net bag having an open mouth, a pair of vanes connected adjacent the open mouth of the net, floats connected to a top portion of the mouth of the net operable to hold the mouth in an open position, a lower leading edge portion of the net mouth extending in advance of the top portion thereof during operation of the trawler net, said lower leading edge portion having spaced intermediate parts; a roller drag assembly including a flexible axle for operable connection to said vanes, said axle having spaced intermediate portions, a plurality of flexible connecting elements secured to said spaced intermediate portions of said axle and to spaced intermediate parts of the lower leading edge portion of the net mouth, a plurality of freely rotatable drag rollers interposed between pairs of said flexible connecting elements and journaled on said flexible drag axle, said drag rollers having a substantially elliptical shape providing unimpeded towing of said net and the minimum resistance when changing the direction of tow of said net, said drag rollers including a plurality of arcuate elements joined at opposite ends and defining an open framework elliptical roller, said rollers being journaled on the axle and presenting relatively little resistance to movement of the net when towed through the water.

2. For use in combination with the trawler net set forth in claim 1 wherein said elliptical drag rollers include a central support element and two relatively smaller diameter end elements, the plurality of slat members being secured to said end elements and said central element, and means secured on said flexible axle adjacent said end elements to prevent axial movement of said rollers on said flexible axle.

3. For use in combination with a trawler net as set forth in claim 2 wherein said central support element and end elements are constructed of metal and said slat members are constructed from a buoyant material to provide substantially weightless rollers when the net is immersed in the water.

References Cited in the file of this patent
UNITED STATES PATENTS

| | | |
|---|---|---|
| 2,081,146 | Harrington | May 25, 1937 |
| 2,244,907 | Enright | June 10, 1941 |

FOREIGN PATENTS

| | | |
|---|---|---|
| 2,288 | Great Britain | 1905 |
| 4,129 | Great Britain | 1915 |
| 22,593 | Great Britain | 1908 |
| 29,533A | Great Britain | 1906 |
| 312,805 | Great Britain | June 6, 1929 |